United States Patent [19]

Lewis et al.

[11] Patent Number: 6,009,099
[45] Date of Patent: Dec. 28, 1999

[54] METHOD OF DELIVERING VIDEO INFORMATION OVER A TELECOMMUNICATIONS NETWORK

[75] Inventors: Stephen Lewis, Napa; K. Martin Stevenson, III, San Rafael; Farzad S. Nabavi, Union City, all of Calif.

[73] Assignee: Alcatel USA Sourcing, L.P., Plano, Tex.

[21] Appl. No.: 08/732,167

[22] Filed: Oct. 16, 1996

Related U.S. Application Data

[60] Provisional application No. 60/024,953, Aug. 30, 1996.

[51] Int. Cl.⁶ ........................................... H04J 3/24
[52] U.S. Cl. ............................. 370/397; 370/468
[58] Field of Search .................... 370/395, 389, 370/396, 397, 398, 399, 351, 352, 356, 357, 535, 537, 431, 432, 449, 462, 464, 465, 466, 489, 485, 496, 498, 468; 348/12, 15, 13, 14, 16, 6, 7; 359/115, 118, 109, 137

[56] References Cited

U.S. PATENT DOCUMENTS

| | | | |
|---|---|---|---|
| 5,345,558 | 9/1994 | Opher et al. | 370/94.1 |
| 5,473,598 | 12/1995 | Takatori et al. | 370/16 |
| 5,519,707 | 5/1996 | Subramanian et al. | 370/94.2 |
| 5,539,884 | 7/1996 | Rebrock | 370/339 |
| 5,673,265 | 9/1997 | Gupta et al. | 370/417 |
| 5,745,837 | 4/1998 | Fuhrmann | 348/12 |

FOREIGN PATENT DOCUMENTS

| | | | |
|---|---|---|---|
| 0406759 | 2/1990 | European Pat. Off. | H04L 12/56 |
| 0653885 | 11/1993 | European Pat. Off. | H04N 7/173 |
| 0614324 | 1/1994 | European Pat. Off. | H04Q 11/04 |
| 9530305 | 11/1995 | WIPO | H04N 7/173 |

OTHER PUBLICATIONS

PCT Search Report, dated Dec. 2, 1997.
Chang, et al., "An Open–Systems Approach to Video on Demand," IEEE (May 1994), No. 5.

*Primary Examiner*—Dang Ton
*Attorney, Agent, or Firm*—Baker & Botts, L.L.P.

[57] ABSTRACT

A video telecommunications delivery network (10) provides video channels to a plurality of set top units (24). Each set top unit sends a video channel request to an associated cell multiplexing unit (20). If the video channel is available, the cell multiplexing unit (20) provides the video channel to the set top unit (22). If the requested video channel is not available, the cell multiplexing unit (20) passes the request to an associated cell routing unit (18). The cell routing unit (18) provides the requested video channel to the set top unit (22) according to availability. If unavailable, cell routing unit 18 provides the video channel request to a digital multicast bank (16). Digital multicast bank (16) delivers the requested video channel if available, otherwise the video channel request is routed to a video information provider (12) through an asynchronous transfer mode (ATM) switch (14). The video information provider (12) delivers the requested video channel to the digital multi-cast bank (16) through the ATM switch (14) for ultimate delivery to a video subscriber at the set top box.

7 Claims, 1 Drawing Sheet

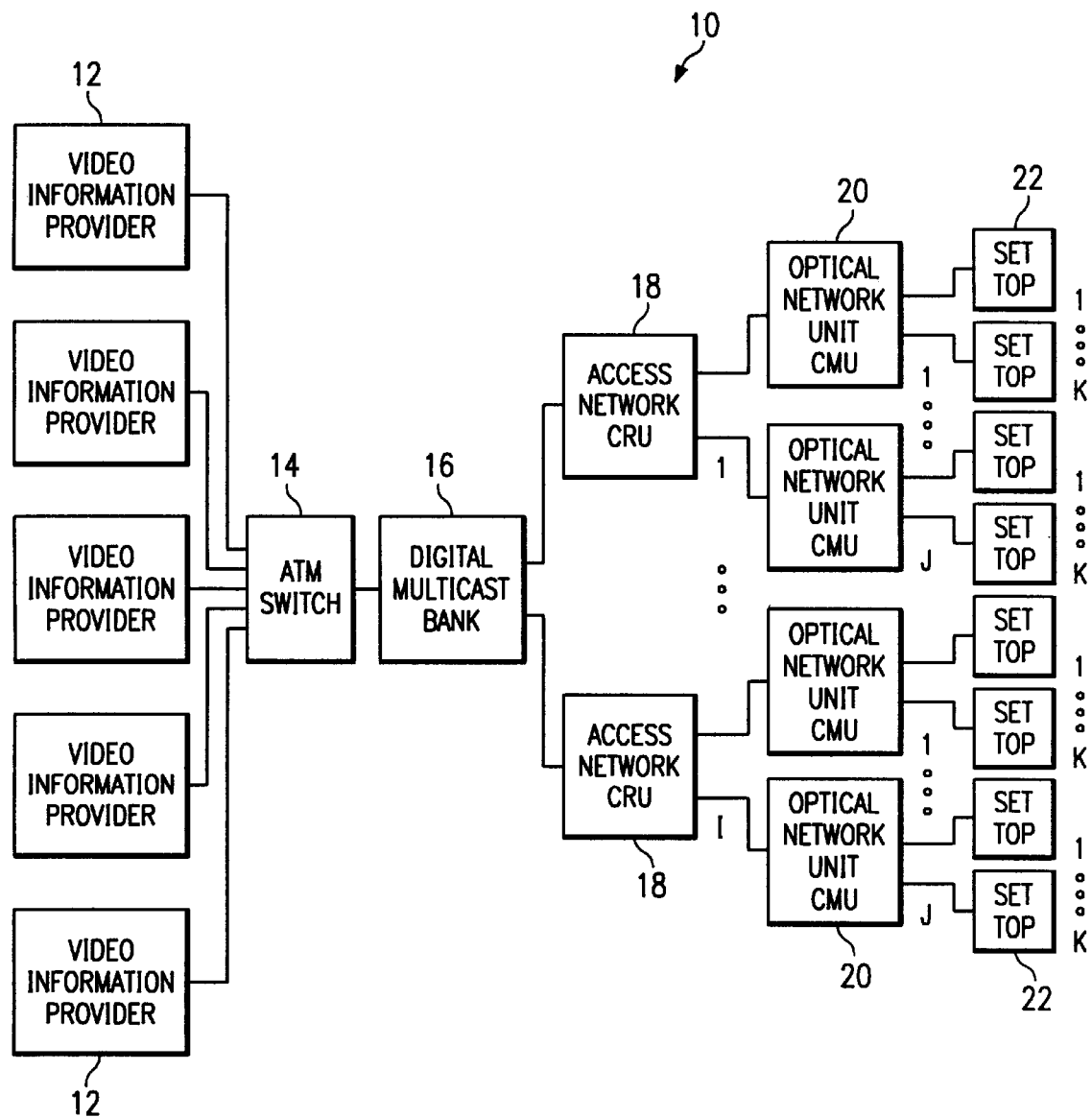

METHOD OF DELIVERING VIDEO INFORMATION OVER A TELECOMMUNICATIONS NETWORK

RELATED PATENT APPLICATION

This application claims the benefit of U.S. Provisional Application Ser. No. 60/024,953, filed on Aug. 30, 1996.

TECHNICAL FIELD OF THE INVENTION

The present invention relates in general to telecommunications signal processing and more particularly to a method of delivering video information over a telecommunications network.

BACKGROUND OF THE INVENTION

In typical telecommunications networks, a central point or administrative unit is notified whenever a request is made by a subscriber. These requests to a central point require a certain amount of bandwidth for proper delivery. For the delivery of video information within the telecommunications network, many of the requests from subscribers would be simple channel changes. These requests for simple channel changes from a subscriber would far exceed the effective bandwidth capability for the telecommunications system. The telecommunications network would not be able to deliver these requests to or handle these requests at a central point. Therefore, it is desirable to decrease bandwidth requirements in a telecommunication network for the efficient delivery of video information.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

The FIGURE illustrates a block diagram of a telecommunications network for delivering video information.

SUMMARY OF THE INVENTION

From the foregoing, it may be appreciated that a need has arisen for a telecommunications network that effectively delivers video information. In accordance with the present invention, a method of delivering video information in a telecommunications network is provided that substantially eliminates or reduces disadvantages and problems associated with conventional video information distribution techniques.

According to an embodiment of the present invention, there is provided a method of delivering video information in a telecommunications network that includes receiving a request for a new video channel from a sender. The request is carried in an asynchronous transfer mode format having a virtual channel identifier associated with the sender. A determination is made whether the new video channel is available and authorized for the sender. If the new video channel is authorized but not available, steps are performed such that the new video channel becomes available. A reply is transmitted to the sender in asynchronous transfer mode format that includes the new video channel.

The present invention provides various technical advantages over conventional video distribution techniques. For example, one technical advantage is to effectively provide video information without unnecessary bandwidth usage, increasing message traffic, and excessive processor load. Another technical advantage is to provide video information only when a video channel has been requested. Other technical advantages are readily apparent to one skilled in the art from the following figures, description, and claims.

DETAILED DESCRIPTION OF THE INVENTION

The FIGURE shows a block diagram of a video telecommunications delivery network 10. Video telecommunications delivery network 10 includes a plurality of video information providers 12 that each supply video information to an asynchronous transfer mode (ATM) switch 14. Video information is placed into an ATM cell format for routing by a digital multicast bank 16. Digital multicast bank 16 transfers video information in ATM cells to a plurality of cell routing units 18. In turn, each cell routing unit transfers video information in ATM cells to a plurality of cell multiplexing units 20 in the vicinity of video subscribers. Each cell multiplexing unit 20 provides the ATM cell based video information to a plurality of set top units 22 at the video subscriber locations.

Delivery of video information begins at a set top unit 22 where a video subscriber desires a specific video channel by number or the next higher or lower video channel. Each set top unit 22 has a pre-assigned virtual circuit identifier (VCI) for sending video channel requests to a respective cell multiplexing unit 20. Cell multiplexing unit 20 receives a request from set top unit 22 over an AAL5 port capable of receiving channel change message requests from a plurality of virtual circuits. Cell multiplexing unit 20 interprets the request from set top unit 22, skipping over channels not currently authorized for channel up or down requests and initiating an authorization procedure for channels specifically requested but not currently authorized. If the requested channel is already being received at cell multiplexing unit 20, the program stream for the video channel is delivered on a VCI which is specified in the reply to the video channel request. Each video channel received at cell multiplexing unit 20 is assigned a dedicated VCI. Cell multiplexing unit 20 translates this VCI to the VCI specified to set top unit 22 currently receiving the video channel.

If the requested video channel is not being received at cell multiplexing unit 20, the video channel request is sent to cell routing unit 18 from cell multiplexing unit 20 over an internal AAL5 link. If currently being received, cell routing unit 18 sends the requested video channel to cell multiplexing unit 20. Cell multiplexing unit 20 does not send another video channel request to cell routing unit 18 until a previous request has been acknowledged and responded. Cell multiplexing unit 20 maintains a record of the last video channel requested by a set top unit 22. In this manner, if video channel requests are not readily serviced, a response to only the most recent video channel request need be performed.

If the requested video channel is not being received at cell routing unit 18, the video channel request is sent from cell routing unit 18 to digital multicast bank 16 over an internal AAL5 link. If currently being received, digital multicast bank 16 sends the requested video channel to cell routing unit 18. If the requested video channel is not being received, digital multicast bank 16 sends the video channel request to an appropriate video information provider 12 as routed by ATM switch 14. If point to multipoint calling is implemented, the video channel request becomes an add party request to the ATM address corresponding to the video channel requested. If point to multi-point calls are not implemented, the video channel request becomes a point to point call to the ATM address corresponding to the video channel requested.

When a new video channel is requested, the delivery of the old video channel to the set top unit 22 of the video subscriber needs to be terminated. Cell multiplexing unit 20 maintains a count of the number of set top units 22 watching each active video channel and the number of video channels currently being received. When the number of set top units 22 providing a specific video channel to the video subscribers reaches zero, the specific video channel is linked to a list of video channels to be deleted. Once the number of video channels being received at cell multiplexing unit 20 exceeds a desired threshold, cell multiplexing unit 20 sends a delete request to its cell routing unit 18 to delete the video channel which has been on the channels to be deleted list the longest.

In order to deliver a requested video channel to a video subscriber, the requested video channel must be authorized for receipt by the video subscriber. Cell multiplexing unit 20 receives the video channel request from the appropriate set top unit 22 and initiates the authorization process. The cell multiplexing unit passes the video channel request to the cell routing unit 18. The cell routing unit 18 does not honor the request and returns a response to set top unit 22 indicating an identity of cell routing unit 18, an identity of set top unit 22, and the ATM address for the serving video information provider 12. Set top unit 22 proceeds to place an authorization call to the serving video information provider 12 that is routed through video telecommunications delivery network 10. The authorization call includes the identity of set top unit 22 and the identity of its associated cell routing unit 18.

When an authorization call is received, video information provider 12 determines the identity of set top unit 22 and determines which video channels set top unit 22 is authorized to receive. Video information provider 12 proceeds to place an authorization update call to the cell routing unit 18 associated with the requesting set top unit 22. The authorization update call includes the identity of set top unit 22, the ATM address for set top unit 22, and the video channels authorized to set top unit 22. For on-demand video requests, the authorization update call also may include a specific video channel to be initially sent to set top unit 22. Set top unit 22 would request any one of a plurality of on-demand video channels and video information provider 12 responds with an authorization update and a particular channel which is appropriate at the time for starting the on-demand program.

Cell routing unit 18 receives the data packet of the authorization update call from video information provider 12. Cell routing unit 18 determines which video information provider 12 is updating authorizations and requests the ATM address of the requesting set top unit 22. Cell routing unit 18 validates the authorization update by comparing the ATM address for set top unit 22 received from video information provider 12 with the ATM address for set top unit 22 received from set top unit 22. Validating authorization updates guards against authorization requests which contain incorrect network identifications or set top unit identification information. Upon validation, cell routing unit updates the authorization for requesting set top unit 22 using the validated information. If no new video channel requests have been received by cell routing unit 18, the particular video channel determined by video information provider 12 is delivered to requesting set top unit 22. Cell routing unit 18 returns a validation response to video information provider 12. If validation was successful, video information provider 12 updates a video channel authorization list for requested set top unit 24.

Thus, it is apparent that there has been provided, in accordance with the present invention, a video telecommunications delivery network and method that satisfies the advantages set forth above. Although the present invention has been described in detail, it should be understood that various changes, substitutions, and alterations readily ascertainable by one skilled in the art may be made herein without departing from the spirit and scope of the present invention as defined by the following claims.

What is claimed is:

1. A method of delivering video information in a telecommunications network, comprising steps of:

receiving selected ones of a plurality of video channels;

receiving a request for a new video channel from a sender, the request being carried in an asynchronous transfer mode format having a virtual circuit identifier associated with the sender of the request;

determining whether the new video channel is authorized for the sender;

determining whether the new video channel is available from the selected ones of the plurality of video channels;

transmitting to the sender a reply to the request, the reply being in an asynchronous transfer mode format having the virtual circuit identifier associated with the sender and including the new video channel;

tracking requests received from the sender;

discarding all requests but a most recent request;

processing the most recent request from the sender.

2. A method of delivering video information in a telecommunications network, comprising steps of:

receiving selected ones of a plurality of video channels:

receiving a request for a new video channel from a sender, the request being carried in an asynchronous transfer mode format having a virtual circuit identifier associated with the sender of the request;

determining whether the new video channel is authorized for the sender;

determining whether the new video channel is available from the selected ones of the plurality of video channels;

transmitting to the sender a reply to the request, the reply being in an asynchronous transfer mode format having the virtual circuit identifier associated with the sender and including the new video channel, wherein the request for a new video channel includes a channel up or down request and further comprising steps of:

interpreting the request as an adjacent authorized higher or lower channel, respectively;

skipping over channels not currently authorized.

3. A telecommunications network for delivering video information, comprising:

a video information provider operable to generate video information;

a telecommunications switch operable to receive the video information from the video information provider, the telecommunication switch operable to place the video information into an asynchronous transfer mode format, the video information being partitioned into a plurality of video channels;

a digital multi-cast bank operable to receive selected ones of the plurality of video channels from the telecommunications switch;

a cell routing unit operable to receive selected ones of the plurality of video channels from the digital multi-cast bank, the digital multi-cast bank operable to provide selected ones of the plurality of video channels to a plurality of cell routing units;

a cell multiplexing unit operable to receive selected ones of the plurality of video channels from the cell routing unit, the cell routing unit operable to provide selected ones of the plurality of video channels to a plurality of cell multiplexing units;

a set top unit operable to request and receive only a desired one of the plurality of video channels from the cell multiplexing unit, the cell multiplexing unit operable to provide the desired one of the plurality of video channels to at least one of a plurality of set top units upon request, wherein the cell multiplexing unit maintains a record of the selected ones of the plurality of video channels provided by the cell routing unit that are not currently requested by the set top unit, the cell multiplexing unit generating a termination request in response to a number of the selected ones of the plurality of video channels in the record exceeding a threshold level, the termination request being sent to the cell routing unit in order to cease transmission to the cell multiplexing unit of those of the selected ones of the plurality of video channels exceeding the threshold level.

4. The telecommunications network of claim 3, wherein the termination request includes an oldest one in the record of the selected ones of the plurality of video channels.

5. A telecommunications network for delivering video information, comprising:

a video information provider operable to generate video information;

a telecommunications switch operable to receive the video information from the video information provider, the telecommunication switch operable to place the video information into an asynchronous transfer mode format, the video information being partitioned into a plurality of video channels;

a digital multi-cast bank operable to receive selected ones of the plurality of video channels from the telecommunications switch;

a cell routing unit operable to receive selected ones of the plurality of video channels from the digital multi-cast bank, the digital multi-cast bank operable to provide selected ones of the plurality of video channels to a plurality of cell routing units;

a cell multiplexing unit operable to receive selected ones of the plurality of video channels from the cell routing unit, the cell routing unit operable to provide selected ones of the plurality of video channels to a plurality of cell multiplexing units;

a set top unit operable to request and receive only a desired one of the plurality of video channels from the cell multiplexing unit, the cell multiplexing unit operable to provide the desired one of the plurality of video channels to at least one of a plurality of set top units upon request, wherein the cell multiplexing unit validates a new video channel request from the set top unit, the cell multiplexing unit providing the desired one of the plurality of video channels to the set top unit upon validation of the new video channel request, wherein the cell multiplexing unit passing the new video channel request to the cell routing unit if the desired one of the plurality of video channels is not available to the cell multiplexing unit.

6. The telecommunications network of claim 5, wherein the cell routing unit validates the new video channel request, the cell routing unit providing the desired one of the plurality of video channels to the cell multiplexing unit for transfer to the set top unit upon validation of the new video channel request.

7. The telecommunications network of claim 6, wherein the cell routing unit passes the new video channel request to the digital multi-cast bank if the desired one of the plurality of video channels is not available to the cell routing unit.

* * * * *